(12) United States Patent
Sugiyama (10) Patent No.: US 12,078,877 B2
(45) Date of Patent: Sep. 3, 2024

(54) OPTICAL MODULATOR AND OPTICAL COMMUNICATION APPARATUS

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 162 days.

(21) Appl. No.: 17/836,074

(22) Filed: Jun. 9, 2022

(65) Prior Publication Data
US 2023/0046400 A1 Feb. 16, 2023

(30) Foreign Application Priority Data

Aug. 11, 2021 (JP) .................................. 2021-131273

(51) Int. Cl.
*G02F 1/035* (2006.01)
*G02F 1/21* (2006.01)

(52) U.S. Cl.
CPC .............. *G02F 1/035* (2013.01); *G02F 1/212* (2021.01)

(58) Field of Classification Search
CPC ...... G02F 1/0316; G02F 1/035; G02F 1/0353; G02F 1/0356; G02F 1/025; G02F 2202/20; G02F 1/212
See application file for complete search history.

(56) References Cited

U.S. PATENT DOCUMENTS

| 6,021,232 A * | 2/2000 | Madabhushi ......... G02F 1/0356 385/40 |
|---|---|---|
| 2002/0106141 A1 | 8/2002 | Gopalakrishnan et al. |
| 2018/0059503 A1* | 3/2018 | Miyazaki ............. H04B 10/505 |
| 2019/0271896 A1* | 9/2019 | Sugiyama ............... G02F 1/218 |

FOREIGN PATENT DOCUMENTS

JP    5-158001 A    6/1993

OTHER PUBLICATIONS

Honardoost et al., Towards subterahertz bandwidth ultracompact lithium niobate electrooptic modulators, 2019, Optics Express, vol. 27, Issue 5, pp. 6495-6501 (Year: 2019).*

* cited by examiner

*Primary Examiner* — Michelle R Connelly
*Assistant Examiner* — Kirsten D. Endresen
(74) *Attorney, Agent, or Firm* — STAAS & HALSEY LLP (57) ABSTRACT

An optical device includes a rib waveguide that is a thin-film lithium niobate (LN) crystal, a buffer layer that is laminated on the rib waveguide, and an electrode that applies voltage to the rib waveguide. The buffer layer includes a thick-film part that is laminated on a rib of the rib waveguide, and thin-film parts that are laminated on slabs of the rib waveguide, where the slabs are located on both sides of the rib, and that have smaller thicknesses than a thickness of the thick-film part.

10 Claims, 5 Drawing Sheets

OPTICAL MODULATOR AND OPTICAL COMMUNICATION APPARATUS

CROSS-REFERENCE TO RELATED APPLICATION

This application is based upon and claims the benefit of priority of the prior Japanese Patent Application No. 2021-131273, filed on Aug. 11, 2021, the entire contents of which are incorporated herein by reference.

FIELD

The embodiments discussed herein are related to an optical device and an optical communication apparatus.

BACKGROUND

A conventional optical modulator includes, for example, optical waveguides that are arranged on a substrate and a modulation unit that is arranged in the vicinity of the optical waveguides. The modulation unit includes a signal electrode and a ground electrode, and if voltage is applied to the signal electrode, electric fields are generated in the optical waveguides, refractive indices of the optical waveguides are changed by the electric fields in the optical waveguides, and a phase of light is changed. The optical waveguides constitute Mach-Zehnder interferometers, and optical output is changed due to a phase difference of light between the optical waveguides.

In the optical modulator, for example, Mach-Zehnder modulators for four channels are integrated. Each of the Mach-Zehnder modulators includes a radio frequency (RF) modulation unit and a direct current (DC) modulation unit. A high-frequency signal with a bandwidth of, for example, dozens of GHz is input to an electrode of the RF modulation unit, and high-speed modulation is performed. Further, bias voltage is applied to an electrode of the DC modulation unit, and bias voltage is adjusted such that ON/OFF of an electrical signal corresponds to ON/OFF of an optical signal.

The optical waveguides of the optical modulator constitute, for example, Mach-Zehnder interferometers, and output, for example, IQ signals that are x- and y-polarized due to a phase difference of light among the plurality of optical waveguides that are arranged in parallel. Further, outputs of each two of the four channels are multiplexed such that two IQ signals are formed, and one of the two IQ signals is subjected to polarization rotation, further subjected to dual-polarization by a polarization beam combiner, and then output.

In contrast, as an optical waveguide, for example, a diffused optical waveguide is known that is formed at a position that does not overlap with the signal electrode by diffusing a metal, such as titanium, from a surface of the substrate. An electrode is arranged on a buffer layer that covers the diffused optical waveguide. Meanwhile, composition and a film thickness of the buffer layer are determined such that a resistance value is reduced to prevent DC drift (a temporal change of emission light caused by applied bias voltage). However, optical confinement in the diffused optical waveguide is low, so that electric field application efficiency is reduced and driving voltage is increased. To cope with this, a thin-film optical waveguide, in which an optical waveguide using a thin film made of a lithium niobate (LN: $LiNbO_3$) crystal is formed at a position that does not overlap with the signal electrode, has been proposed. In the thin-film optical waveguide, it is possible to increase optical confinement as compared to the diffused optical waveguide in which a metal is diffused, so that it is possible to improve the electric field application efficiency and reduce the driving voltage.

Figure 7:
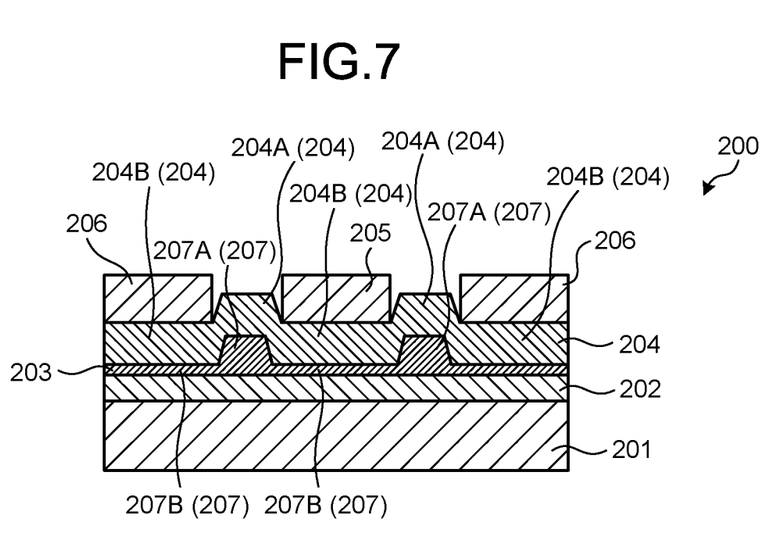
FIG. 7 is a schematic cross-sectional view illustrating an example of a DC modulation unit of an optical modulator.

The optical modulator includes an RF modulation unit and a DC modulation unit. FIG. 7 is a schematic cross-sectional view illustrating an example of a DC modulation unit 200 of the optical modulator. The DC modulation unit 200 illustrated in FIG. 7 includes a support substrate 201 that is made of silicon (Si) or the like, and an intermediate layer 202 that is laminated on the support substrate 201. Further, the DC modulation unit 200 includes a thin-film LN substrate 203 that is laminated on the intermediate layer 202, and a buffer layer 204 that is made of $SiO_2$ and laminated on the thin-film LN substrate 203.

The thin-film LN substrate 203 serves as convex-shaped thin-film optical waveguides 207 that protrude upward. Each of the thin-film optical waveguides 207 is a rib waveguide that includes a rib 207A and slabs 207B that are formed on both sides of the rib 207A. Further, the ribs 207A and the slabs 207B are covered by the buffer layer 204, and a signal electrode 205 and a pair of ground electrodes 206 having a coplanar waveguide (CPW) structure are arranged on a surface of the buffer layer 204. In other words, the signal electrode 205 and the pair of ground electrodes 206 sandwiching the signal electrode 205 are arranged on the buffer layer 204. Meanwhile, the buffer layer 204 is able to prevent light that propagates through the thin-film optical waveguides 207 from being absorbed by the signal electrode 205 and the ground electrodes 206.

The convex-shaped thin-film optical waveguides 207 are formed on the thin-film LN substrate 203 at positions between the signal electrode 205 and each of the ground electrodes 206. Further, stepped portions 204A that cover the entire convex-shaped thin-film optical waveguides 207 are arranged on the buffer layer 204 at the positions between the signal electrode 205 and each of the ground electrodes 206.

With use of the thin-film optical waveguides 207 as described above, by applying bias voltage to the signal electrode 205 to generate electric fields and changing refractive indices of the thin-film optical waveguides 207, it is possible to modulate light that propagates through the thin-film optical waveguides 207.

Patent Literature 1: Japanese Laid-open Patent Publication No. H5-158001

Patent Literature 2: U.S. Unexamined Patent Application Publication No. 2002/0106141

In the thin-film optical waveguides 207 of the optical modulator, the buffer layer 204 serves as cladding, so that a mode field of light that propagates through the thin-film optical waveguides 207 is input even to the inside of the buffer layer 204. Therefore, a thickness of the buffer layer 204 needs to be increased to prevent light in the thin-film optical waveguides 207 form being absorbed by the signal electrode 205 and the ground electrodes 206.

However, even if the thickness of the buffer layer 204 is increased, the resistance value of the buffer layer 204 increases as compared to the LN crystal at the time of increase in temperature. Therefore, even if bias voltage is applied to the signal electrode 205, DC drift occurs in which bias voltage applied to the buffer layer 204 gradually increases with a temporal change, and bias voltage applied to the ribs 207A of the thin-film optical waveguides 207 is relatively reduced. As a result, the electric field is gradually reduced, so that it becomes difficult to normally control the optical modulator. Therefore, there is a demand to prevent occurrence of DC drift.

SUMMARY

According to an aspect of an embodiment, an optical device includes a rib waveguide, a buffer layer and an electrode. The rib waveguide is a thin-film lithium niobate (LN) crystal. The buffer layer is laminated on the rib waveguide. The electrode applies voltage to the rib waveguide. The buffer layer includes a thick-film part and thin-film parts. The thick-film part is laminated on a rib of the rib waveguide. The thin-film parts are laminated on slabs of the rib waveguide. The slabs are located on both sides of the rib, and have smaller thicknesses than a thickness of the thick-film part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited by the embodiments below.

[a] First Embodiment

Figure 1:
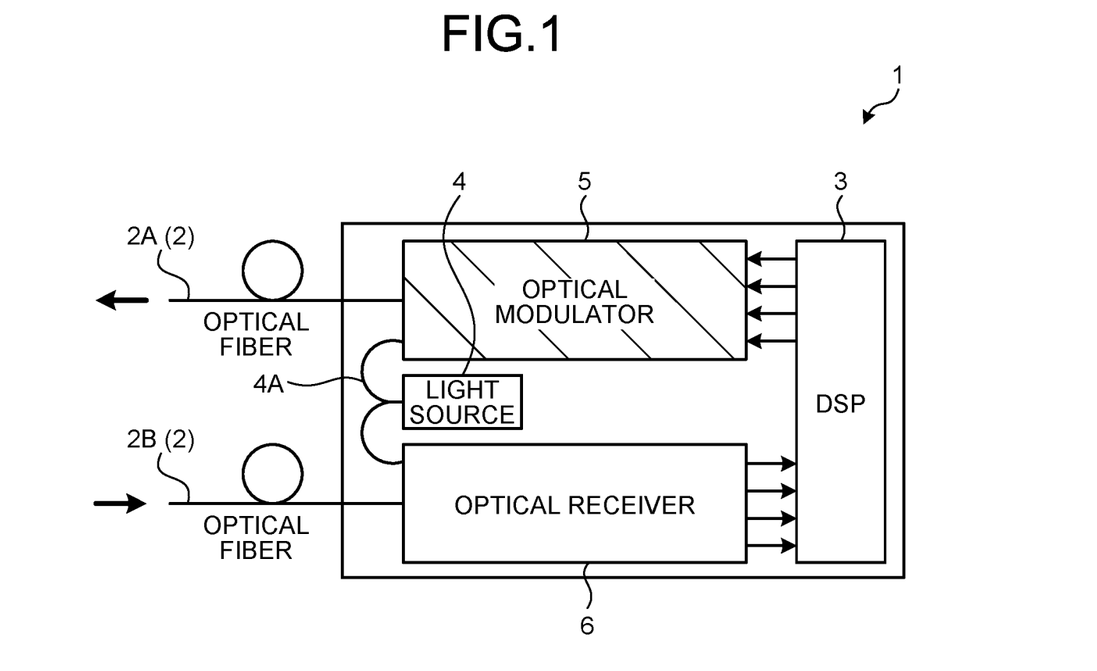
FIG. 1 is a block diagram illustrating an example of a configuration of an optical communication apparatus according to a first embodiment.

F FIG. 1 is a block diagram illustrating an example of a configuration of an optical communication apparatus 1 according to a first embodiment. The optical communication apparatus 1 illustrated in FIG. 1 is connected to an optical fiber 2A (2) at an output side and an optical fiber 2B (2) at an input side. The optical communication apparatus 1 includes a digital signal processor (DSP) 3, a light source 4, an optical modulator 5, and an optical receiver 6. The DSP 3 is an electrical component that performs digital signal processing. The DSP 3 performs processing, such as encoding, on transmission data, generates an electrical signal including the transmission data, and outputs the generated electrical signal to the optical modulator 5, for example. Further, the DSP 3 acquires an electrical signal including reception data from the optical receiver 6, performs processing, such as decoding, on the acquired electrical signal, and obtains reception data.

The light source 4 includes, for example, a laser diode or the like, generates light at a predetermined wavelength, and supplies the light to the optical modulator 5 and the optical receiver 6. The optical modulator 5 is an optical device that modulates the light supplied from the light source 4 by using the electrical signal output from the DSP 3, and outputs the obtained optical transmission signal to the optical fiber 2A. The optical modulator 5 is an optical device, such as a lithium niobate (LN: $LiNbO_3$) optical modulator, that includes an optical waveguide and a modulation unit, for example. The LN optical waveguide is formed by a substrate made of an LN crystal. The optical modulator 5, when the light supplied from the light source 4 propagates through the LN optical waveguide, modulates the light by the electrical signal that is input to the modulation unit, and generates an optical transmission signal.

The optical receiver 6 receives an optical signal from the optical fiber 2B and demodulates the received optical signal by using the light supplied from the light source 4. Then, the optical receiver 6 converts the demodulated received optical signal into an electrical signal, and outputs the converted electrical signal to the DSP 3.

Figure 2:
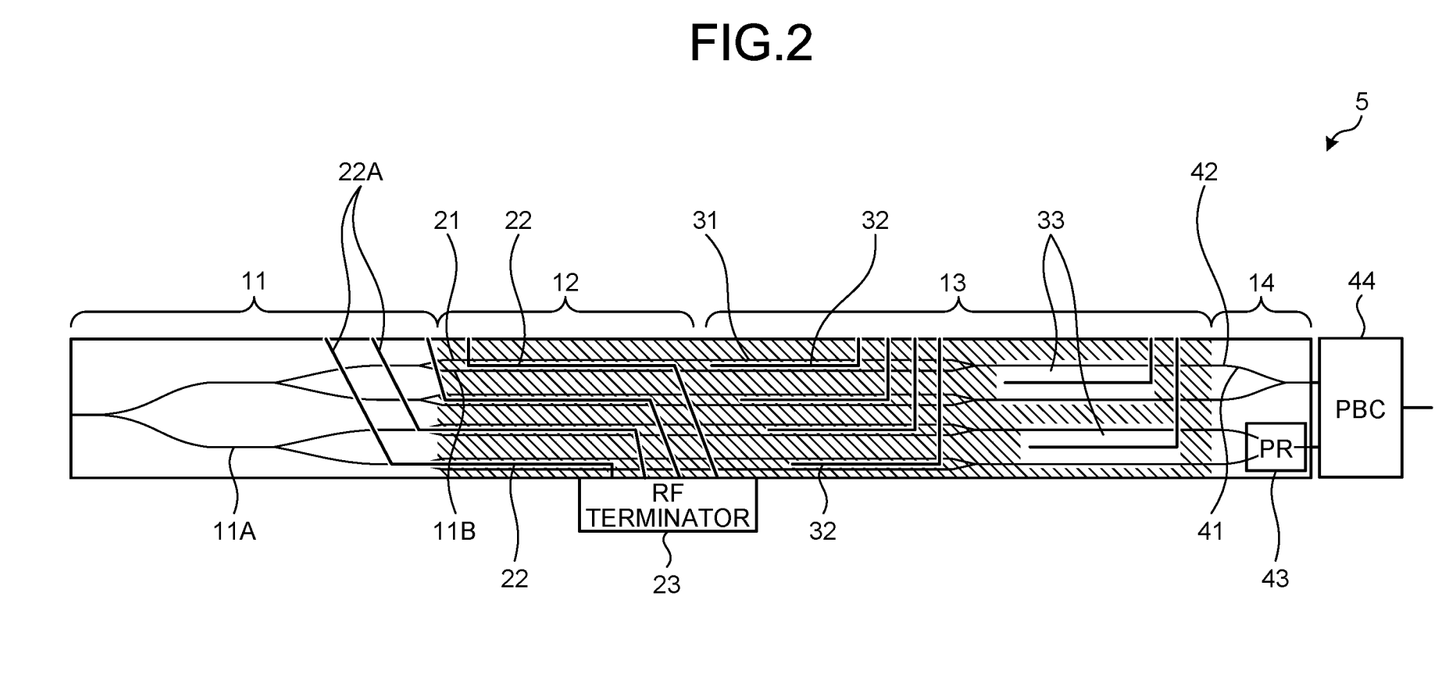
FIG. 2 is a schematic plan view illustrating an example of a configuration of an optical modulator according to the first embodiment.

FIG. 2 is a schematic plan view illustrating an example of a configuration of the optical modulator 5 according to the first embodiment. The optical modulator 5 illustrated in FIG. 2 is connected to an optical fiber 4A from the light source 4 at an input side and is connected to the optical fiber 2A for outputting a transmission signal at an output side. The optical modulator 5 includes a first optical input unit 11, a radio frequency (RF) modulation unit 12, a direct current (DC) modulation unit 13, and a first optical output unit 14. The first optical input unit 11 includes a first optical waveguide 11A and first waveguide bonding units 11B. The first optical waveguide 11A includes a single optical waveguide that is connected to the optical fiber 4A, two optical waveguides that are branched from the single optical waveguide, four optical waveguides that are branched from the two optical waveguides, and eight optical waveguides that are branched from the four optical waveguides. The first waveguide bonding units 11B bond the eight optical waveguides in the first optical waveguide 11A and eight LN optical waveguides in the LN optical waveguides 21.

The RF modulation unit 12 includes the LN optical waveguides 21, electrodes 22, and an RF terminator 23. The RF modulation unit 12, when light supplied from the first optical waveguide 11A propagates through the LN optical waveguides 21, modulates the light by using electric fields that are applied from signal electrodes 22A of the electrodes 22. The LN optical waveguides 21 are, for example, rib optical waveguides that are formed by using a thin-film LN substrate 53, are repeatedly branched from the input side, and are formed of the eight LN optical waveguides that are parallel to one another. The light that propagates through and modulated in the LN optical waveguides 21 is output to first DC modulation units 32 in the DC modulation unit 13. The thin-film LN substrate 53 is an X-cut substrate in which a refractive index increases when DC voltage is applied in an X-axis direction of the crystal.

The signal electrodes 22A in the electrodes 22 are arranged at positions that do not overlap with the LN optical waveguides 21, and apply electric fields to the LN optical waveguides 21 in accordance with an electric signal that is output from the DSP 3. Terminal ends of the signal electrodes 22A in the electrodes 22 are connected to the RF terminator 23. The RF terminator 23 is connected to the terminal ends of the signal electrodes 22A, and prevents unnecessary reflection of signals that are transmitted by the signal electrodes 22A.

The DC modulation unit 13 includes LN optical waveguides 31 that are bonded to the LN optical waveguides 21 of the RF modulation unit 12, the first DC modulation units 32, and second DC modulation units 33. The first DC modulation units 32 are four child-side Mach-Zehnder (MZ) interferometers. The second DC modulation units 33 are two parent-side MZ interferometers. The first DC modulation units 32 include the LN optical waveguides 31 and the electrodes 22.

The LN optical waveguides 31 include eight LN optical waveguides, and four LN optical waveguides that merge with two LN optical waveguides among the eight LN optical waveguides. The first DC modulation unit 32 is arranged for each two LN optical waveguides among the eight LN optical waveguides 31. The first DC modulation units 32 apply bias voltage to the signal electrodes 22A on the LN optical waveguides 31 to adjust bias voltage such that ON/OFF of an electrical signal corresponds to ON/OFF of an optical signal, and output I signals that are in-phase components or Q signals that are quadrature components. The second DC modulation unit 33 is arranged for each two LN optical waveguides among the four LN optical waveguides in the LN optical waveguides 31. The second DC modulation units 33 apply bias voltage to the signal electrodes 22A on the LN optical waveguides 31 to adjust bias voltage such that ON/OFF of an electrical signal corresponds to ON/OFF of an optical signal, and output I signals or Q signals.

The first optical output unit 14 includes second waveguide bonding units 41, second optical waveguides 42, a polarization rotator (PR) 43, and a polarization beam combiner (PBC) 44. The second waveguide bonding units 41 bond the LN optical waveguides 31 in the DC modulation unit 13 and the second optical waveguides 42. The second optical waveguides 42 include four optical waveguides that are connected to the second waveguide bonding units 41, and two optical waveguides that merge with two optical waveguides among the four optical waveguides.

The PR 43 rotates the I signal or the Q signal that is input from one of the second DC modulation units 33 by 90 degrees, and obtains a vertically-polarized optical signal that is rotated by 90 degrees. Then, the PR 43 inputs the vertically-polarized optical signal to the PBC 44. The PBC 44 couples the vertically-polarized optical that is signal input from the PR 43 and a horizontally-polarized optical signal that is input from the other one of the second DC modulation units 33, and outputs a dual-polarized signal.

Figure 3:
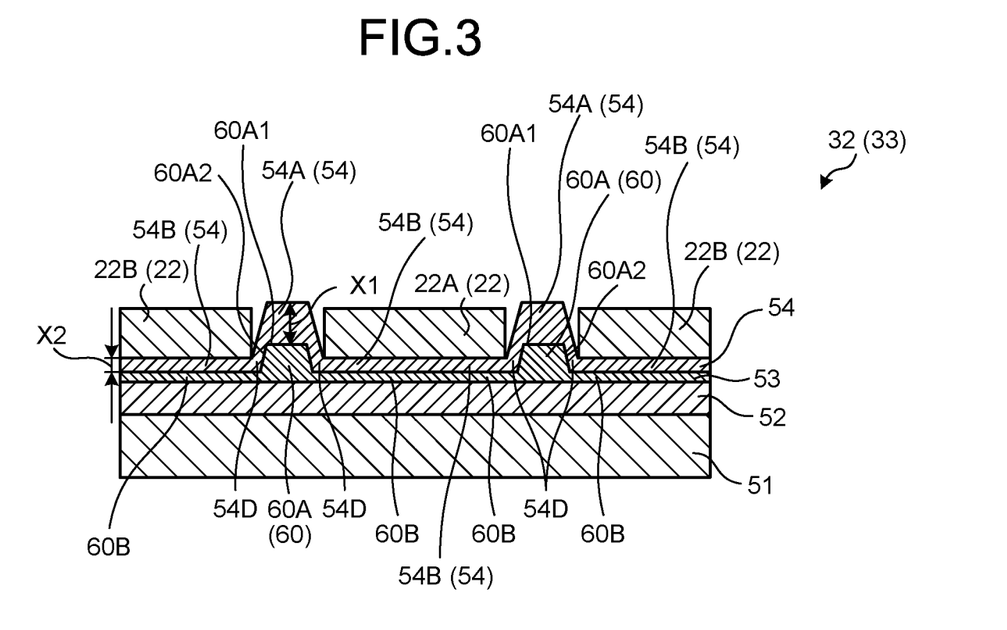
FIG. 3 is a schematic cross-sectional view illustrating an example of a first DC modulation unit of the optical modulator according to the first embodiment.

A configuration of the optical modulator 5 according to the first embodiment will be described in detail below. FIG. 3 is a schematic cross-sectional view illustrating an example of the first DC modulation unit 32 of the optical modulator 5 according to the first embodiment. Meanwhile, the second DC modulation units 33 have the same configurations as those of the first DC modulation units 32, and therefore, the same components are denoted by the same reference symbols, and explanation of the same configurations and operation will be omitted. The first DC modulation unit 32 illustrated in FIG. 3 includes a support substrate 51, and an intermediate layer 52 that is laminated on the support substrate 51. Further, the first DC modulation unit 32 includes the thin-film LN substrate 53 that is a thin-film LN crystal laminated on the intermediate layer 52, a buffer layer 54 that is laminated on the thin-film LN substrate 53, and electrodes 22. The electrodes 22 include the signal electrode 22A and a pair of ground electrodes 22B.

The support substrate 51 is a substrate that is made of, for example, silicon dioxide ($SiO_2$), titanium dioxide ($TiO_2$), Si, LN, or the like. The intermediate layer 52 is a layer that is made of a transparent material, such as $SiO_2$ or $TiO_2$, with a lower refractive index than LN. Similarly, the buffer layer 54 is a layer that is made of a transparent material, such as $SiO_2$ or $TiO_2$, with a lower refractive index than LN.

The thin-film LN substrate 53 serves as convex-shaped thin-film optical waveguides 60 that protrude upward. The thin-film optical waveguides 60 are the LN optical waveguides 31 of the first DC modulation units 32. Each of the thin-film optical waveguides 60 is a rib optical waveguide that includes a rib 60A and slabs 60B that are formed on both sides of the rib 60A. Each of the ribs 60A includes an upper surface 60A1 of the rib 60A and side wall surfaces 60A2 of the rib 60A. Further, the thin-film optical waveguides 60 are covered by the buffer layer 54. The buffer layer 54 is arranged to prevent light that propagates through the thin-film optical waveguides 60 from being absorbed by the electrode 22.

The buffer layer 54 includes thick-film parts 54A that cover the upper surfaces 60A1 of the ribs 60A of the thin-film optical waveguides 60, and thin-film parts 54B that cover the slabs 60B of the thin-film optical waveguides 60. A thickness X2 of each of the thin-film parts 54B is smaller than a thickness X1 of each of the thick-film parts 54A. The signal electrode 22A and the pair of ground electrodes 22B are arranged on the thin-film parts 54B.

The ribs 60A in the thin-film optical waveguides 60 serve as the thin-film optical waveguides 60 located between the signal electrode 22A and each of the ground electrodes 22B. Further, the thick-film parts 54A serve as the buffer layer 54 that covers the ribs 60A in the thin-film optical waveguides 60 located between the signal electrode 22A and each of the ground electrodes 22B. The slabs 60B in the thin-film optical waveguides 60 serve as the thin-film optical waveguides 60 located at the signal electrode 22A and each of the ground electrodes 22B. Furthermore, the thin-film parts 54B serve as the buffer layer 54 that covers the slabs 60B in the thin-film optical waveguides 60 at positions of the signal electrode 22A and the ground electrode 22B. Stepped portions 54D that cover the side wall surfaces 60A2 of the ribs 60A ensure separation from the ground electrodes 22B or the signal electrode 22A.

The thin-film optical waveguides 60 of the thin-film LN substrate 53 with thicknesses of 0.5 to 3 micrometers (μm) are sandwiched between the intermediate layer 52 and the buffer layer 54. Widths of the ribs 60A that serve as the thin-film optical waveguides 60 are, for example, about 1 to 8 μm.

The signal electrode 22A is an electrode that is made of a metal material, such as gold or copper, has a width of 2 to 10 μm, and has a thickness of 1 to 20 μm, for example. The ground electrodes 22B are electrodes that are made of a metal material, such as gold or copper, and have thicknesses of 1 μm or more, for example. If bias voltage corresponding to the electric signal that is output from the DSP 3 is applied to the signal electrode 22A, electric fields in directions from the signal electrode 22A to the ground electrodes 22B are generated, and the electric fields are applied to the thin-film optical waveguides 60. As a result, refractive indices of the thin-film optical waveguides 60 are changed in accordance with the application of the electric fields to the thin-film optical waveguides 60, and it becomes possible to modulate light that propagates through the thin-film optical waveguides 60.

In the first DC modulation unit 32, the thick-film parts 54A serve as the buffer layer 54 that covers the ribs 60A of the thin-film optical waveguides 60, and the thin-film parts 54B serve as the buffer layer 54 in portions on which the electrodes 22 are laminated. As a result, in the thick-film parts 54A, the thickness of the buffer layer 54 is increased, so that it is possible to prevent a light scattering loss in which light that is guided by the ribs 60A is absorbed by the electrode 22. Furthermore, in the thin-film parts 50B, the thickness of the buffer layer 54 is reduced, so that it is possible to prevent occurrence of DC drift due to a temporal change. Meanwhile, by reducing the thickness of the buffer layer 54 between the electrodes 22 and the thin-film optical waveguides 60 of the LN crystal, an influence of a resistance value of the buffer layer 54 at the time of increase in temperature is reduced. As a result, it is possible to prevent occurrence of DC drift at the time of increase in temperature.

Therefore, the applicants verified a 50%-arrival time of DC drift of the first DC modulation unit 32 based on the following conditions. As for the condition for the first DC modulation unit 32, the thicknesses of the thick-film parts 54A of the buffer layer 54 are set to 1.2 μm, the thicknesses of the thin-film parts 54B are set to 0.2 μm, and environmental temperature is set to 120° C. Further, as for the condition for the conventional DC modulation unit 200, the thickness of the buffer layer 204 (204A and 204B) is set to 1.2 μm, and environmental temperature is set to 120° C. As a result, in the first DC modulation unit 32, it is possible to increase the 50-% arrival time of DC drift by four times as compared to the conventional DC modulation unit 200.

In the first DC modulation unit 32 of the first embodiment, the thick-film parts 54A serve as the buffer layer 54 that covers the ribs 60A of the thin-film optical waveguides 60, and the thin-film parts 54B serve as the buffer layer 54 in lamination portions in which the electrodes 22 are laminated. As a result, in the thick-film parts 54A, the thickness of the buffer layer 54 is increased, so that it is possible to prevent a light scattering loss in which light that is guided by the ribs 60A is absorbed by the electrode 22. In the thin-film parts 54B, the influence of the resistance value of the buffer layer 54 is reduced, so that it is possible to prevent occurrence of DC drift at the time of increase in temperature due to a temporal change. Furthermore, because it is possible to prevent occurrence of DC drift, it is possible to increase a lifetime of the first DC modulation units 32.

In the second DC modulation unit 33, the thick-film parts 54A serve as the buffer layer 54 that covers the ribs 60A of the thin-film optical waveguides 60, and the thin-film parts 54B serve as the buffer layer 54 in the lamination portions in which the electrodes 22 are laminated. As a result, in the thick-film parts 54A, the thickness of the buffer layer 54 is increased, so that it is possible to prevent a light scattering loss in which light that is guided by the ribs 60A is absorbed by the electrode 22. Furthermore, in the thin-film parts 54B, the influence of the resistance value of the buffer layer 54 is reduced, so that it is possible to prevent occurrence of DC drift at the time of increase in temperature due to a temporal change. Moreover, because it is possible to prevent occurrence of DC drift, it is possible to increase a lifetime of the second DC modulation unit 33.

In the first DC modulation unit 32 of the first embodiment, the thick-film parts 54A that serve as the buffer layer 54 that covers the upper surfaces 60A1 of the ribs 60A, but the thickness of the buffer layer 54 between the electrodes 22 and the side wall surfaces 60A2 of the ribs 60A is reduced. As a result, with reduction in the thickness of the buffer layer 54 between the electrodes 22 and the side wall surfaces 60A2 of the ribs 60A, there may be a case in which light that is guided in the ribs 60A is absorbed by the electrodes 22 and a light scattering loss increases. Therefore, it is preferable to increase the thickness of the buffer layer 54 between the electrodes 22 and the side wall surfaces 60A2 of the ribs 60A, and this embodiment will be described below as a second embodiment.

[b] Second Embodiment

Figure 4:
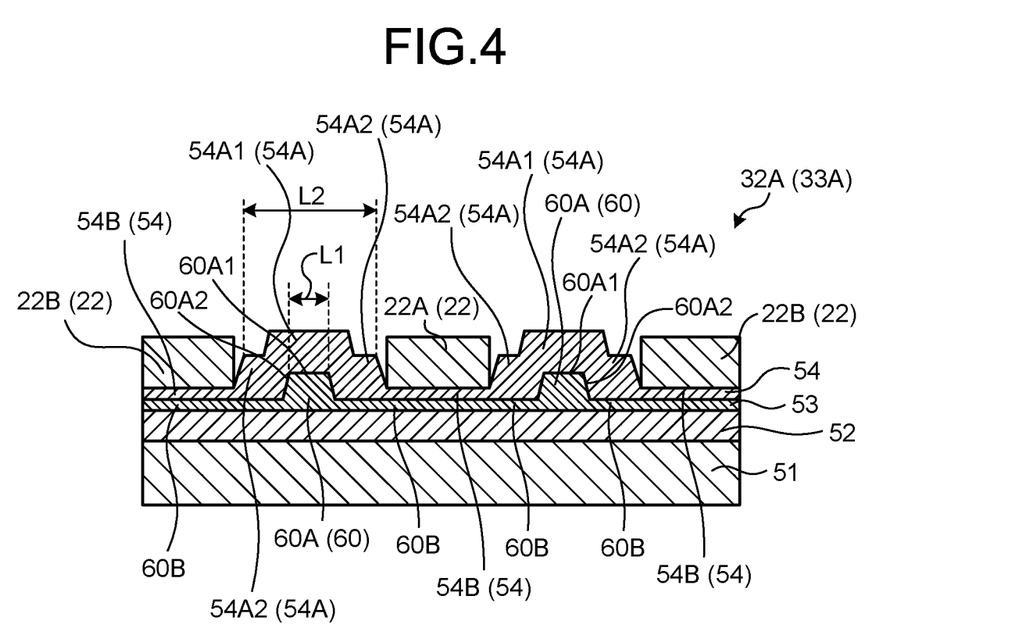
FIG. 4 is a schematic cross-sectional view illustrating an example of a first DC modulation unit of an optical modulator according to a second embodiment.

FIG. 4 is a cross-sectional view illustrating an example of a first DC modulation unit 32A of the optical modulator 5 according to the second embodiment. Meanwhile, the same components as those of the optical modulator 5 according to the first embodiment are denoted by the same reference symbols, and explanation of the same configurations and operation will be omitted. The first DC modulation unit 32A illustrated in FIG. 4 is different from the first DC modulation unit 32 in FIG. 3 in that a width L2 of each of the thick-film parts 54A is increased as compared to a width L1 of each of the ribs 60A.

Each of the thick-film parts 54A of the buffer layer 54 includes a first thick-film part 54A1 that covers the upper surface 60A1 of the rib 60A of the thin-film optical waveguide 60, and second thick-film parts 54A2 that cover the side wall surfaces 60A2 of the rib 60A and cover parts of the slabs 60B at the sides of the rib 60A. The second thick-film parts 54A2 have larger thicknesses than the thicknesses of the thin-film parts 54B. Further, the width L2 of each of the thick-film parts 54A is increased as compared to the width L1 of each of the ribs 60A. Meanwhile, for convenience of explanation, if the thicknesses of the second thick-film parts 54A2 are set to the same as the thicknesses of the first thick-film parts 54A1, it is possible to simplify a generation process of the thick-film parts 54A.

In the first DC modulation unit 32A of the second embodiment, the width L2 of each of the thick-film parts 54A is increased as compared to the width L1 of each of the ribs 60A, and the second thick-film parts 54A2 of the thick-film parts 54A cover the side wall surfaces 60A2 of the ribs 60A. As a result, the electrodes 22 are separated from the side wall surfaces 60A2 of the ribs 60A by the second thick-film parts 54A2, so that it is possible to prevent a scattering loss of light that is guided in the ribs 60A. Furthermore, in the thin-film parts 54B, the thickness of the buffer layer 54 is reduced, so that it is possible to prevent occurrence of DC drift due to a temporal change.

In a second DC modulation unit 33A, the width L2 of each of the thick-film parts 54A is increased as compared to the width L1 of each of the ribs 60A, and the second thick-film parts 54A2 of the thick-film parts 54A cover the side wall surfaces 60A2 of the ribs 60A. As a result, the electrodes 22 are separated from the side wall surfaces 60A2 of the ribs 60A by the second thick-film parts 54A2, so that it is possible to prevent a scattering loss of light that is guided in the ribs 60A. Further, in the thin-film parts 54B, the thickness of the buffer layer 54 is reduced, so that it is possible to prevent occurrence of DC drift due to a temporal change.

Furthermore, in the first DC modulation unit 32A according to the second embodiment, widths of the thin-film parts 54B and widths of lamination areas of the electrodes 22 on the thin-film parts 54B are the same. Therefore, for example, if mask misalignment occurs when the electrodes 22 are laminated on the thin-film parts 54B in a manufacturing process, parts of the electrodes 22 may be laminated on the second thick-film parts 54A2. Therefore, an embodiment of the optical modulator 5 that copes with the situation as described above will be described below as a third embodiment.

[c] Third Embodiment

Figure 5:
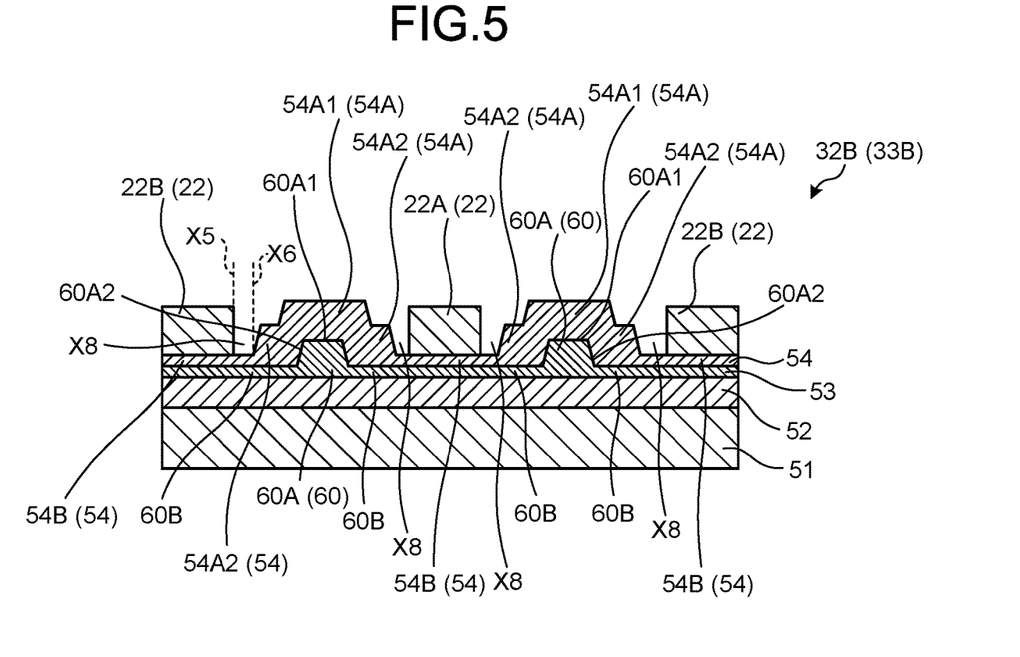
FIG. 5 is a schematic cross-sectional view illustrating an example of a first DC modulation unit of an optical modulator according to a third embodiment.

FIG. 5 is a cross-sectional view illustrating an example of a first DC modulation unit 32B of the optical modulator 5 according to the third embodiment. Meanwhile, the same components as those of the optical modulator 5 according to the second embodiment are denoted by the same reference symbols, and explanation of the same configuration and operation will be omitted. The first DC modulation unit 32B illustrated in FIG. 5 is different from the first DC modulation unit 32A illustrated in FIG. 4 in that the widths of the thin-film parts 54B are increased such that one end of the electrode 22, that is, an edge portion X5, is separated from each of the second thick-film parts 54A2. In other words, a gap X8 is arranged between the edge portion X5 of each of the electrodes 22 and an edge portion X6 of each of the second thick-film parts 54A2, so that an edge portion of each of the thin-film parts 54B is located on the rib 60A side relative to the edge portion X5 of each of the electrodes 22.

The widths of the thin-film parts 54B are increased such that the edge portions X5 of the electrodes 22 are separated from the second thick-film parts 54A2. As a result, even if mask misalignment occurs when the electrodes 22 are laminated on the thin-film parts 54B, it is possible to prevent a situation in which parts of the electrodes 22 are laminated on the second thick-film parts 54A2.

The widths of the thin-film parts 54B are increased such that the edge portions X5 of the ground electrodes 22B are separated from the second thick-film parts 54A2. As a result, even if mask misalignment occurs when the ground electrodes 22B are laminated on the thin-film area 54B, it is possible to prevent a situation in which a part of the ground electrodes 22B are laminated on any of the second thick-film parts 54A2.

The widths of the thin-film parts 54B are increased such that the edge portions X5 of the signal electrode 22A are separated from the second thick-film parts 54A2. As a result, even if mask misalignment occurs when the signal electrode 22A is laminated on the thin-film area 54B, it is possible to prevent a situation in which a part of the signal electrode 22A is laminated on any of the second thick-film parts 54A2.

In the first DC modulation unit 32B of the third embodiment, the widths of the thin-film parts 54B are increased such that one ends of the electrodes 22 are separated from the second thick-film parts 54A2. As a result, even if mask misalignment occurs when the electrodes 22 are laminated on the thin-film parts 54B, it is possible to prevent a situation in which parts of the electrodes 22 are laminated on the second thick-film parts 54A2. Furthermore, in the thin-film parts 54B, the thickness of the buffer layer 54 is reduced, so that it is possible to prevent occurrence of DC drift due to a temporal change.

In a second DC modulation unit 33B, the widths of the thin-film parts 54B are increased such that one ends of the electrodes 22 are separated from the second thick-film parts 54A2. As a result, even if mask misalignment occurs when the electrodes 22 are laminated on the thin-film parts 54B, it is possible to prevent a situation in which parts of the electrodes 22 are laminated on the second thick-film parts 54A2. Furthermore, in the thin-film parts 54B, the thickness of the buffer layer 54 is reduced, so that it is possible to prevent occurrence of DC drift due to a temporal change.

In the first DC modulation unit 32B according to the third embodiment, the case has been described in which the widths of the thin-film part 54B are increased such that one ends of the electrodes 22 are separated from the second thick-film parts 54A2. The electrodes 22 need to have certain widths to ensure adhesiveness with respect to the buffer layer 54. However, if the widths of the thin-film parts 54B in which the thickness of the buffer layer 54 is reduced are excessively increased in accordance with the widths of the electrodes 22, a large amount of etching dust is generated by plasma etching or the like, and it becomes difficult to perform etching operation on the buffer layer 54. Therefore, an embodiment that can cope with the situation as described above will be described below as a fourth embodiment.

[d] Fourth Embodiment

Figure 6:
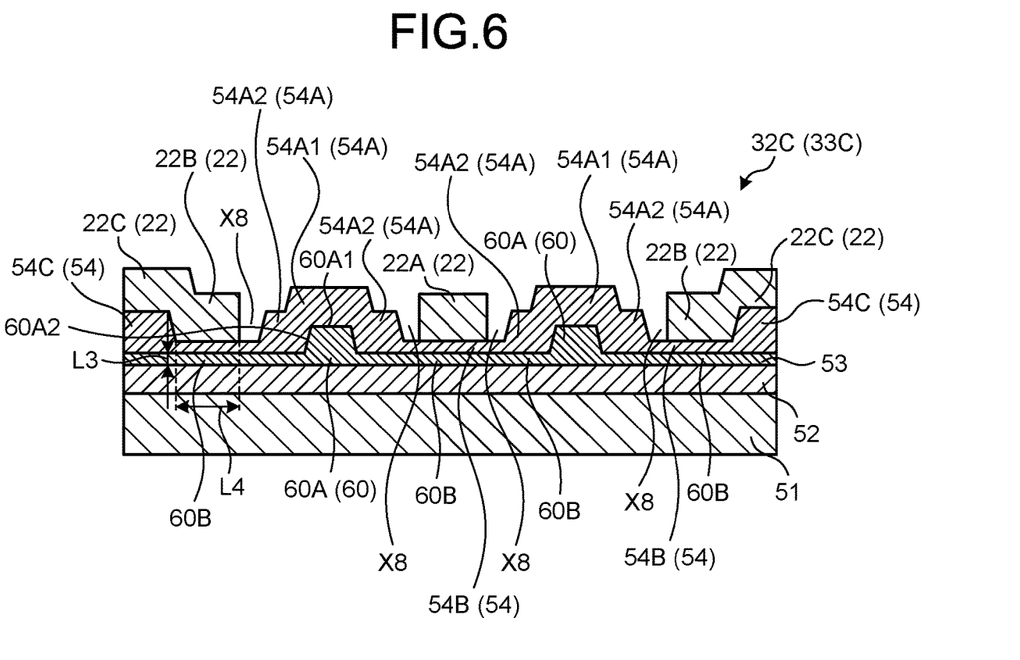
FIG. 6 is a schematic cross-sectional view illustrating an example of a first DC modulation unit of an optical modulator according to a fourth embodiment.

FIG. 6 is a cross-sectional view illustrating an example of the first DC modulation unit 32 of the optical modulator 5 according to the fourth embodiment. Meanwhile, the same components as those of the optical modulator 5 according to the third embodiment are denoted by the same reference symbols, and explanation of the same configuration and operation will be omitted. A first DC modulation unit 32C illustrated in FIG. 6 is different from the first DC modulation unit 32B illustrated in FIG. 5 in that parts 22C of the electrodes 22 are laminated on third thick-film parts 54C that are located on opposite sides of the ribs 60A at positions other than the positions of the thin-film parts 54B in the buffer layer 54.

Further, if widths of the lamination portions in which the electrodes 22 come into contact with the thin-film parts 54B are excessively reduced, the resistance value of the buffer layer 54 is increased, so that it becomes difficult to achieve the effect of preventing occurrence of DC drift. To cope with this, widths L4 of the laminating portions in which the electrodes 22 come into contact with the thin-film parts 54B are increased as compared to thicknesses L3 of the thin-film parts 54B.

In the first DC modulation unit 32C according to the fourth embodiment, it is allowed to laminate the parts 22C of the electrodes 22 on the third thick-film parts 54C in addition to the thin-film parts 54B. As compared to the thin-film parts 54B according to the third embodiment, it is not needed to increase the widths of the thin-film parts 54B, so that it is possible to simplify the etching operation on the buffer layer 54. Furthermore, the widths L4 of the lamination portions in which the electrodes 22 come into contact with the thin-film parts 54B are increased as compared to the thicknesses L3 of the thin-film parts 54B. As a result, it is possible to reduce the resistance value of the buffer layer 54, so that it is possible to ensure the effect of preventing DC drift.

In a second DC modulation unit 33C, it is allowed to laminate the parts 22C of the electrodes 22 on the third thick-film parts 54C in addition to the thin-film parts 54B. As compared to the thin-film parts 54B according to the third embodiment, it is not needed to increase the widths of the thin-film parts 54B, so that it is possible to simplify the etching operation of the buffer layer 54. Furthermore, the widths L4 of the laminating portions in which the electrodes 22 come into contact with the thin-film parts 54B are increased as compared to the thicknesses L3 of the thin-film parts 54B. As a result, it is possible to reduce the resistance value of the buffer layer 54, so that it is possible to ensure the effect of preventing DC drift.

According to one embodiment of the optical device or the like disclosed in the present application, it is possible to prevent occurrence of DC drift.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising:
   a rib waveguide that is a thin-film lithium niobate (LN) crystal;
   a buffer layer that is laminated on the rib waveguide;
   a signal electrode that is adjacent to the rib waveguide and inputs an electric signal to the rib waveguide; and
   a ground electrode that is adjacent to the rib waveguide and outputs the electric signal from the rib waveguide, wherein
   the buffer layer includes
      a thick-film part that is laminated on a rib of the rib waveguide; and
      thin-film parts that are laminated on slabs of the rib waveguide, the slabs being located on both sides of the rib, and that have smaller thicknesses than a thickness of the thick-film part,
   the thick-film part includes
      a first thick-film part that covers the rib; and
      second thick-film parts that cover side wall surfaces of the rib, and cover parts of the slabs at sides of the rib, and
   a second thick-film part of the second thick-film parts includes
      a first stepped portion that is separated from one side wall surface at a side of the signal electrode of the side wall surfaces of the rib; and
      a second stepped portion that is separated from other side wall surface at a side of a ground electrode of the side wall surfaces of the rib.

2. The optical modulator according to claim 1, wherein the thick-film part has a wider width than a width of the rib.

3. The optical modulator according to claim 2, wherein the second thick-film parts have larger thicknesses than the thickness of the thin-film parts.

4. The optical modulator according to claim 3, wherein widths of the thin-film parts are increased with respect to zero width such that one end of the signal electrode or the ground electrode is separated from the second thick-film parts.

5. The optical modulator according to claim 4, wherein a part of the ground electrode is laminated on a third thick-film part that is different from the first thick-film part and the second thick-film parts, at a position other than positions of the thin-film parts in the buffer layer.

6. The optical modulator according to claim 5, wherein a width of a lamination portion in which the signal electrode or the ground electrode comes into contact with the thin-film parts is greater than the thickness of the thin-film parts.

7. The optical modulator according to claim 1, wherein the signal electrode and the ground electrode are a direct current (DC) electrode.

8. The optical modulator according to claim 1, wherein the signal electrode and the ground electrode are a radio frequency (RF) electrode.

9. The optical modulator according to claim 1, wherein the buffer layer is made of a certain material with a temperature dependent resistivity of which a resistance value of the certain material is increased as compared to a resistance value of the thin-film LN crystal at a time of increase in temperature.

10. An optical communication apparatus comprising:
    a processor that performs signal processing on an electric signal;
    a light source that generates light; and
    an optical modulator that modulates light generated by the light source by using an electric signal output from the processor, wherein
    the optical modulator includes
       a rib waveguide that is a thin-film lithium niobate (LN) crystal;
    a buffer layer that is laminated on the rib waveguide;
    a signal electrode that is adjacent to the rib waveguide and inputs an electric signal to the rib waveguide; and
    a ground electrode that is adjacent to the rib waveguide and outputs the electric signal from the rib waveguide, and
    the buffer layer includes
       a thick-film part that is laminated on a rib of the rib waveguide; and
       thin-film parts that are laminated on slabs of the rib waveguide, the slabs being located on both sides of the rib, and that have smaller thicknesses than a thickness of the thick-film part,
    the thick-film part includes
       a first thick-film part that covers the rib; and
       second thick-film parts that cover side wall surfaces of the rib, and cover parts of the slabs at sides of the rib, and
    a second thick-film part of the second thick-film parts includes
       a first stepped portion that is separated from one side wall surface at a side of the signal electrode of the side wall surfaces of the rib; and
       a second stepped portion that is separated from other side wall surface at a side of a ground electrode of the side wall surfaces of the rib.

\* \* \* \* \*